US010821638B2

(12) United States Patent
Huang et al.

(10) Patent No.: US 10,821,638 B2
(45) Date of Patent: Nov. 3, 2020

(54) MOBILE PHONE MIDDLE PLATE HAVING SECTIONAL OUTER FRAME

(71) Applicant: JINYAHAO PRECISION METAL SCIENCE AND TECHNOLOGY (SHEN ZHEN) Co. LTD., Shenzhen (CN)

(72) Inventors: Yifeng Huang, Shenzhen (CN); Zhifeng Hong, Shenzhen (CN)

(73) Assignee: JINYAHAO PRECISION METAL SCIENCE AND TECHNOLOGY (SHEN ZHEN) Co. Ltd., Shenzhen (CN)

( * ) Notice: Subject to any disclaimer, the term of this patent is extended or adjusted under 35 U.S.C. 154(b) by 0 days.

(21) Appl. No.: 15/959,770

(22) Filed: Apr. 23, 2018

(65) Prior Publication Data

US 2019/0070760 A1  Mar. 7, 2019

(30) Foreign Application Priority Data

Sep. 6, 2017  (CN) .......................... 2017 1 0797761

(51) Int. Cl.
*H04M 1/00* (2006.01)
*B29C 45/14* (2006.01)
(Continued)

(52) U.S. Cl.
CPC ..... *B29C 45/14467* (2013.01); *H04M 1/0202* (2013.01); *H04M 1/026* (2013.01);
(Continued)

(58) Field of Classification Search
CPC ... B29C 45/14467; B29C 2045/14532; H04M 1/026; H04M 1/0279; B29L 2031/3443
(Continued)

(56) References Cited

U.S. PATENT DOCUMENTS 7,212,845 B2 * 5/2007 Ikeuchi ............... H04M 1/0214
379/433.04
7,647,079 B2 * 1/2010 Zuo ..................... H01M 2/1066
455/550.1
(Continued)

FOREIGN PATENT DOCUMENTS

| CN | 108605066 A | 9/2018 |
| KR | 20160099664 A | 8/2016 |
| KR | 20170092794 A | 8/2017 |

OTHER PUBLICATIONS

KR first Office Action dated Jun. 13, 2019 re: Application No. 10-2018-0052394, pp. 1-5.

*Primary Examiner* — Marceau Milord
(74) *Attorney, Agent, or Firm* — Gang Yu

(57) ABSTRACT

A mobile phone middle plate having a sectional outer frame. An outer metal frame, a middle metal frame welded in the outer metal frame, and a first plastic member and a second plastic member which are disposed in the outer metal frame. The outer metal frame is formed by splicing at least two metal section bars, and the adjacent metal section bars have certain gaps so as to form an antenna separator. The gaps are welded together by concave connecting blocks which are welded on the inner side surface of the outer metal frame. The first plastic member and the second plastic member are respectively clamped with the upper end and the lower end of the middle metal frame. The mobile phone middle plate having a sectional outer frame provided by the present invention has the advantages of good structural strength and low manufacturing cost.

9 Claims, 3 Drawing Sheets

(51) Int. Cl.
*H04M 1/02* (2006.01)
*B29L 31/34* (2006.01)

(52) U.S. Cl.
CPC . *H04M 1/0279* (2013.01); *B29C 2045/14532* (2013.01); *B29L 2031/3443* (2013.01)

(58) Field of Classification Search
USPC .. 455/575.1, 575.4, 575.3, 575.8, 90.3, 566, 455/556.1
See application file for complete search history.

(56) References Cited

U.S. PATENT DOCUMENTS

| | | | | |
|---|---|---|---|---|
| 7,801,577 B2* | 9/2010 | Lee | ............... | H04M 1/0262 |
| | | | | 174/257 |
| 8,164,885 B2* | 4/2012 | Lu | ............... | H01M 2/1055 |
| | | | | 361/679.01 |
| 8,964,380 B2* | 2/2015 | Lee | ............... | H01Q 1/243 |
| | | | | 361/679.01 |
| 9,049,279 B2* | 6/2015 | Choi | ............... | H04M 1/0264 |
| 9,182,842 B2* | 11/2015 | Cho | ............... | G06F 1/1671 |
| 9,258,393 B2* | 2/2016 | Park | ............... | H04M 1/0206 |
| 9,513,668 B2* | 12/2016 | Shin | ............... | G06F 3/041 |
| 9,629,268 B2* | 4/2017 | Lee | ............... | H05K 5/0247 |
| 9,794,382 B2* | 10/2017 | Yang | ............... | H04M 1/0249 |
| 9,876,893 B2* | 1/2018 | Yoo | ............... | H04M 1/7253 |
| 9,949,597 B2* | 4/2018 | Tsibulevskiy | ............... | A47K 3/281 |
| 9,955,825 B2* | 5/2018 | Tsibulevskiy | ............... | A47K 3/281 |
| 2004/0053649 A1* | 3/2004 | Sun | ............... | H04M 1/0249 |
| | | | | 455/575.1 |
| 2006/0084481 A1* | 4/2006 | Tseng | ............... | H04M 1/0262 |
| | | | | 455/575.1 |
| 2008/0227480 A1* | 9/2008 | Cho | ............... | H01H 13/704 |
| | | | | 455/550.1 |
| 2010/0331050 A1* | 12/2010 | Tahk | ............... | H01Q 1/243 |
| | | | | 455/566 |
| 2011/0165916 A1* | 7/2011 | Park | ............... | H01Q 1/06 |
| | | | | 455/566 |
| 2012/0034957 A1* | 2/2012 | Kim | ............... | H01Q 1/084 |
| | | | | 455/572 |
| 2013/0017865 A1* | 1/2013 | Allore | ............... | H01Q 1/243 |
| | | | | 455/566 |
| 2014/0125528 A1* | 5/2014 | Tsai | ............... | H01Q 13/106 |
| | | | | 343/702 |
| 2016/0134010 A1* | 5/2016 | Yan | ............... | H01Q 1/1207 |
| | | | | 343/702 |

* cited by examiner

MOBILE PHONE MIDDLE PLATE HAVING SECTIONAL OUTER FRAME

FIELD

The present invention relates to the technical field of middle plates in mobile phones, and in particular to a mobile phone middle plate having a sectional outer frame.

BACKGROUND

With the rapid development of smart phones, the mobile phone middle frame is evolved into a mode of metal (for example, stainless steel, a titanium alloy or an aluminum alloy) plus plastic from a single plastic material. The appearance and hand feel of the mobile phone are obviously improved, and since the mobile phone body is made of metal, the heat dissipation property of the mobile phone is also improved greatly.

By taking the mobile phone middle frame made of stainless steel as an example, there are two main processes for the manufacturing of the existing stainless steel mobile phone middle frame.

One process adopts a full CNC process, that is, a whole stainless steel plate is applied with CNC processing and molding. Since the shell part has a structural function and an electrical function simultaneously, such as a metal antenna, the CNC processing volume in such a method is very large. In addition, the utilization rate of the stainless steel is low, the amount of consumption is large. As a result, the manufacturing cost thereof is staying at a high level.

The other process is to integrate a stainless steel outer frame and the mobile phone middle plate by riveting, that is, the metal frame and the middle metal frame are manufactured separately and then connected together in a manner of mechanical riveting. As some space is occupied, the structural design of the whole set is influenced.

SUMMARY

In view of the defects in the prior art, the main purpose of the present invention is to provide a mobile phone middle plate having a sectional outer frame, which is high in structural strength and low in manufacturing cost.

For the above objective, the mobile phone middle plate having a sectional outer frame according to the present invention comprises an outer metal frame, a middle metal frame welded in the outer metal frame, and a first plastic member and a second plastic member which are disposed in the outer metal frame.

The outer metal frame is formed by splicing at least two metal section bars, and the adjacent metal section bars have certain gaps so as to form an antenna separator. The gaps are connected together by concave connecting blocks which are welded on the inner side surface of the outer metal frame.

The two sides of the middle metal frame are welded on the inner side surface of the outer metal frame.

The upper surface of the first plastic member is tightly attached to the inner side surface of the upper end of the outer metal frame. The upper surface of the first plastic member is disposed with first bulges matched with the gaps of the upper end of the outer metal frame respectively. The first bulges are clamped in the gaps on the upper end of the outer metal frame respectively. The lower end of the first plastic member is clamped on the upper end of the middle metal frame.

The lower surface of the second plastic member is tightly attached to the inner side surface of the lower end of the outer metal frame. The lower surface of the second plastic member is disposed with second bulges matched with the gaps of the lower end of the outer metal frame respectively. The second bulges are clamped in the gaps on the lower end of the outer metal frame respectively. The upper end of the second plastic member is clamped on the lower end of the middle metal frame.

Preferably, the lower end of the first plastic member is disposed with a plurality of trapezoid bulges. The upper end of the middle metal frame is disposed with grooves corresponding to the trapezoid bulges respectively. During assembly, the trapezoid bulges are clamped in the grooves respectively.

Preferably, the first plastic member and the second plastic member are formed by intra-mold injection.

Preferably, the middle metal frame is formed by sheet metal working on stainless steel or a titanium alloy.

Preferably, the middle metal frame is formed by pressure casting an aluminum alloy.

Preferably, the outer side surfaces of the metal section bars are arcuate.

Preferably, the metal section bars are formed by bending 304 stainless steel or 316 stainless steel.

Preferably, the metal section bar is disposed with a key hole, a card slot hole or an earphone hole.

Preferably, the concave connecting blocks are made of stainless steel.

According to the technical solution of the present invention, the mobile phone middle plate is divided into the outer metal frame and the middle metal frame, which are welded into the mobile phone middle plate by separate welding. The outer metal frame is formed by installing and welding a plurality of sections of metal section bars formed by sheet metal working, and is better in structural strength and low in cost. Meanwhile, the certain gaps are set among the adjacent metal section bars as an antenna separator in the mobile phone middle plate to ensure a better signal transceiving effect. The functional plastic members are injection-molded between the outer metal frame and the middle metal frame by intra-mold injection, and the gaps are further filled with the bulges of the plastic members formed in the gaps of the outer metal frame, thereby further improving the integral strength of the outer metal frame. The metal section bars adopt the section bars with arcuate outer side surfaces. The CNC processing volume of the outer metal frame is reduced. The processing cost is further reduced.

Compared with the prior art, the production efficiency of the mobile phone middle plate formed by separate welding is much higher than that of full CNC processing parts. The cost is low, and pricy CNC investment is greatly reduced. Meanwhile, as the gaps of the outer metal frame are welded by the concave connecting blocks and are filled by the plastic members, the structural strength is good.

BRIEF DESCRIPTION OF THE DRAWINGS

In order to clarify the technical solutions in the embodiments or the prior art of the present disclosure, figures used in the embodiments or the prior art will be briefly described. It is obvious that the figures described below are merely some of the embodiments of the disclosure. Those ordinary skilled in the art can obtain all other figures based on the structures illustrated in the figures, without any inventive work.

Introductions to reference signs:

| Signs | Name |
|---|---|
| 100 | Outer metal frame |
| 101 | Gap |
| 110 | First frame |
| 120 | Second frame |
| 130 | Third frame |
| 131 | Power source key hole |
| 132 | Volume key hole |
| 140 | Fourth frame |
| 141 | Card slot hole |
| 150 | Concave connecting block |
| 200 | Middle metal frame |
| 210 | Groove |
| 310 | First plastic member |
| 311 | First bulge part |
| 312 | Trapezoid bulge part |
| 320 | Second plastic member |
| 321 | Second bulge part |

The implementation of the objective, function characteristics and advantages of the present invention are further explained with reference to accompanying drawings in combination with embodiments.

DETAILED DESCRIPTION

The present invention provides a mobile phone middle plate having a sectional outer frame.

Figure 1:
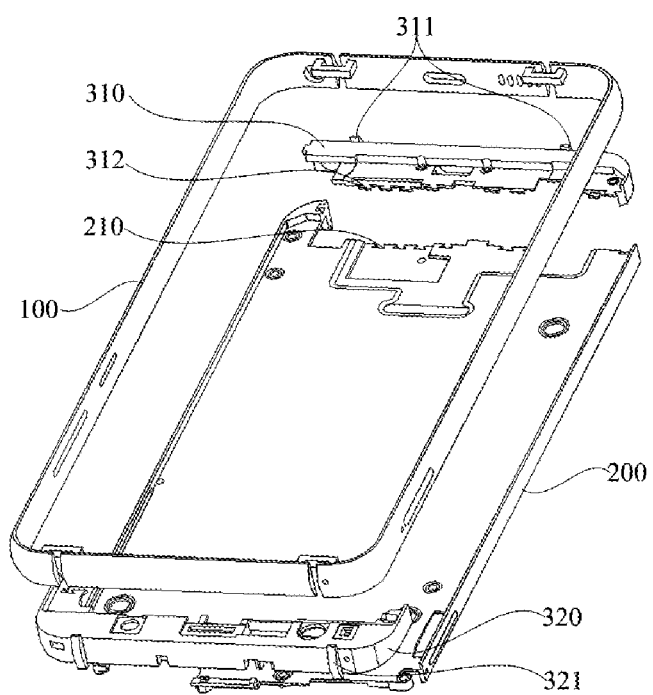
FIG. 1 is an exploded view of an embodiment of a mobile phone middle plate having a sectional outer frame according to the present invention.
Figure 2:
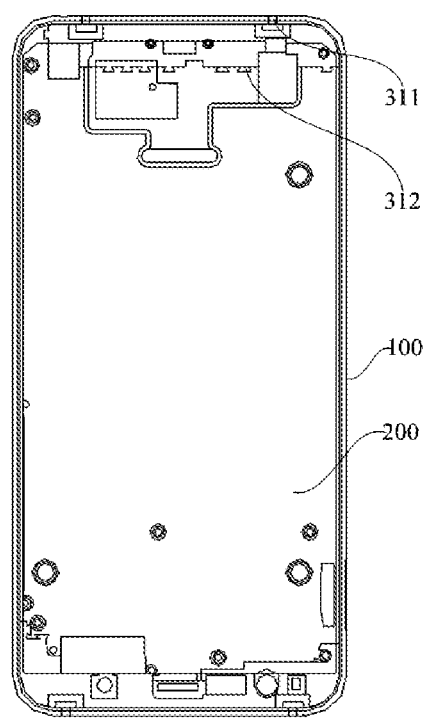
FIG. 2 is an assembly view of an embodiment of a mobile phone middle plate having a sectional outer frame according to the present invention.
Figure 3:
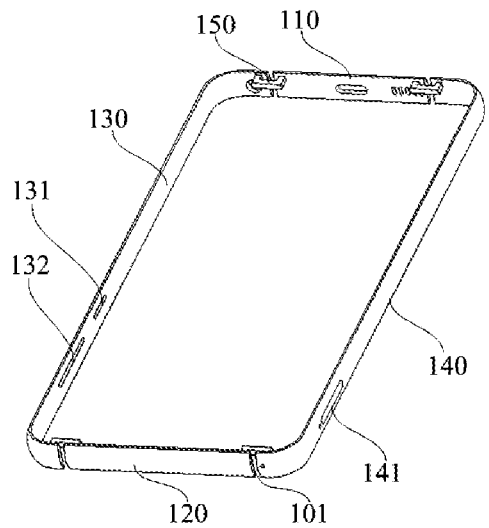
FIG. 3 is a structural schematic view of an outer metal frame.
Figure 4:
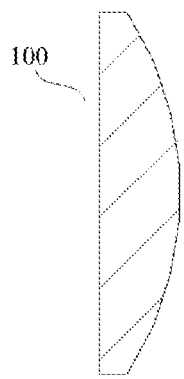
FIG. 4 is a sectional view of the outer metal frame.

Referring to FIGS. 1-4, FIG. 1 is an exploded view of an embodiment of a mobile phone middle plate having a sectional outer frame according to the present invention, FIG. 2 is an assembly view of an embodiment of a mobile phone middle plate having a sectional outer frame according to the present invention, FIG. 3 is a structural schematic view of an outer metal frame, and FIG. 4 is a sectional view of the outer metal frame.

As shown in FIG. 1, in the embodiment of the present invention, the mobile phone middle plate having a sectional outer frame, characterized by comprising: an outer metal frame 100, a middle metal frame 200 welded in the outer metal frame 100, and a first plastic member 310 and a second plastic member 320 which are disposed in the outer metal frame 100. The outer metal frame 100 is formed by splicing at least two metal section bars. The two sides of the middle metal frame 200 are welded on the inner side surface of the outer metal frame 100. The first plastic member 310 is clamped on the upper end of the middle metal frame 200. The second plastic member 320 is clamped on the lower end of the middle metal frame 200.

As shown in FIG. 3, the outer metal frame 100 is formed by splicing four metal section bars, which respectively are a first frame 110 and a second frame 120 disposed in parallel and a third frame 130 and a fourth frame 140 disposed in parallel. The first frame 110, the second frame 120, the third frame 130 and the fourth frame 140 are respectively processed into shapes of respectively corresponding parts through a bending formation process according to a shape of the outer metal frame 100. When the first frame 110, the second frame 120, the third frame 130 and the fourth frame 140 are spliced into a whole, a certain gap 101 is reserved between the first frame 110 and the third frame 130 and between the first frame 110 and the fourth frame 140 respectively. The certain gap 101 is also reserved between the second frame 120 and the third frame 130 and between the second frame 120 and the fourth frame 140 respectively. A concave connecting block 150 is adopted in each gap 101 for welding, and the concave connecting block 150 is welded on the inner side surface of the outer metal frame 100.

In the present embodiment, compared with the complete outer frame processed by adopting CNC on a large metal sheet, the outer metal frame 100 formed by sectional installation and welding is low in processing cost and high in production efficiency, and the welding connection strength meets the requirements of the outer metal frame 100 on strength and rigidity in terms of structures and usage. Since the outer metal frame 100 will affect transceiving of a mobile phone signal, certain gaps 101 are reserved between the adjacent frames to serve as an antenna separator, such that the mobile phone signal can be received and transmitted through the gaps 101. By welding the concave connecting blocks 150 on the inner side of the outer metal frame 100, a welding influence area is very small, and no adverse effect is generated on the appearance effect of the outer metal frame 100.

As shown in FIG. 4, in the present embodiment, the first frame 110, the second frame 120, the third frame 130 and the fourth frame 140 adopt a stainless steel section bar with an arcuate outer side surface respectively, such that the workload of processing the corresponding arcuate surfaces on the outer side surface of the outer metal frame 100 with CNC is avoided. Not only is lots of processing time is saved, but also the CNC processing cost of the outer metal frame 100 is reduced.

In the present embodiment, the middle metal plate 200 is formed by adopting a stainless steel alloy or a titanium alloy made of sheet metal working, or by an aluminum alloy made of pressure casting. It should be noted that the middle metal frame 200 can adopt a structural member formed by adopting materials such as the aluminum alloy, stainless steel and a titanium alloy made of sheet metal working or a structural member formed by pressure casting the aluminum alloy according to actual needs. In both cases, the CNC processing volume of the middle metal frame 200 is reduced, and the manufacturing cost is lower than the full CNC process. By taking the aluminum alloy as an example, the manufacturing cost of the middle metal frame 200 pressure-cast by the aluminum alloy is generally about RMB 5-10 yuan. The time for welding the middle metal frame 200 and the outer metal frame 100 into a whole by adopting automatic welding is 10-20 seconds, and the cost is about a few RMB yuan. If the mobile phone middle plate is manufactured by using full CNC processing, the time for processing the structure of the mobile phone middle plate is about 30 minutes, and the corresponding cost is about RMB 25 yuan. Therefore, compared with the mobile phone middle plate manufactured by full CNC processing, the middle metal frame 200 formed by pressure casting on the aluminum alloy is lower in cost and more efficient.

As shown in FIG. 1, the upper surface of the first plastic member 310 is tightly attached to the inner side surface of the upper end of the outer metal frame 100, and the upper surface of the first plastic member is disposed with first bulges 311 matched with the gaps 101 of the upper end of the outer metal frame 100 respectively. The first bulges 311 are clamped in the gaps 101 on the upper end of the outer metal frame 100 respectively. The lower end of the first plastic member 310 is clamped on the upper end of the middle metal frame 200. Similarly, the lower surface of the second plastic member 320 is tightly attached to the inner side surface of the lower end of the outer metal frame 100, and the lower surface of the second plastic member is disposed with second bulges 321 matched with the gaps 101 of the lower end of the outer metal frame 100 respectively. The second bulges 321 are clamped in the gaps 101 on the lower end of the outer metal frame 100 respectively. The upper end of the second plastic member 321 is clamped on the lower end of the middle metal frame 200.

Specifically, in the present embodiment, both the first plastic member 310 and the second plastic member 320 are formed by intra-mold injection between the outer metal frame 100 and the middle metal frame 200. By adopting the existing NMT technology, the inner side surfaces of the middle metal frame 200 and the outer metal frame 100 are applied with T processing and then injection-molding, thereby improving the combined strength between the first plastic member 310 and the second plastic member and the middle metal frame 200 and the outer metal frame 100 respectively. While the first plastic member 310 is molded, the corresponding gaps 101 are filled by the first bulges 311 formed in the gaps 101 of the outer metal frame 100. Similarly, while the second plastic member 320 is molded, the corresponding gaps 101 are filled by the second bulges 321 formed in the gaps 101 of the outer metal frame 100, thereby further improving the integral strength of the outer metal frame 100.

After the first plastic member 310 and the second plastic member 320 are molded between the outer metal shell and the middle metal frame 200, then the whole mobile phone middle plate is applied with CNC finish machining, and the outer metal frame 100 is applied with appearance processing such as sand blasting, paint spraying, highlight chamfering, or electroplating, such that the metal middle frame can present multiple kinds of colors, and the texture and performance of the mobile phone outer frame are improved.

According to the technical solution of the present invention, the mobile phone middle plate is divided into the outer metal frame 100 and the middle metal frame 200, which are then welded into the mobile phone middle plate by separate welding. The outer metal frame 100 is formed by installing and welding on a plurality of metal section bars formed by sheet metal working, and the structural strength is good and the cost is low. The certain gaps 101 are disposed between the adjacent metal section bars as an antenna separator of the mobile phone middle plate, so as to ensure a better signal transceiving effect. The functional plastic members are injection-molded between the outer metal frame 100 and the middle metal frame 200 by adopting an intra-mold injection manner, and the gaps 101 are further filled by the bulges of the plastic members formed in the gaps 101 of the outer metal frame 100, thereby further improving the integral strength of the outer metal frame 100. The metal section bars adopt the section bars with the arcuate outer side surfaces, thereby reducing the CNC processing volume of the outer metal frame 100 and further reducing the processing cost.

Compared with the prior art, the production efficiency of the mobile phone middle plate formed by adopting separate welding according to the present invention is much higher than that of the full CNC processing members, the cost is lower, and the pricy CNC investment is also greatly reduced. Meanwhile, the gaps 101 of the outer metal frame 100 are welded by the concave connecting blocks 150, and are filled by the plastic members, so that the structural strength is good.

As shown in FIGS. 1-2, in the present embodiment, the upper end of the middle metal frame 200 is provided with a plurality of trapezoid grooves 210, such that when the first plastic member 310 is injection-molded, the connecting parts between the first plastic member and the middle metal frame 200 form trapezoid bulges 312 corresponding to the grooves 210 respectively. Each trapezoid bulge 312 is clamped in corresponding groove 210. Through the clamping structures between the trapezoid bulges 312 and the grooves 210, the connecting strength between the first plastic member 310 and the middle metal frame 200 is further improved. Similarly, the same clamping structures may also be adopted between the second plastic member 320 and the middle metal frame 200 to improve the connecting strength between the second plastic member 320 and the middle metal frame 200.

In order to further ensure the structural strength of the outer metal frame 100, in the present embodiments, the first frame 110, the second frame 120, the third frame 130 and the fourth frame 140 are all made of high quality stainless steel. Specifically, in the present embodiment, the first frame 110, the second frame 120, the third frame 130 and the fourth frame 140 are made of 304 stainless steel or 316 stainless steel with excellent mechanical properties. In addition, both the 304 stainless steel or 316 stainless steel have better corrosion resistance and high temperature resistance, such that the outer metal frame 100 can better resist acid and alkali corrosion and can avoid deformation due to high temperatures.

To further improve the welding structural strength of the outer metal frame 100, in the present embodiment, the concave connecting blocks 150 is made of the high quality stainless steel congenetic with the outer metal frame 100.

As shown in FIG. 3, in the present embodiment, the first frame 110 is disposed with an earphone hole, the third frame 130 is disposed with a power source key hole 131 and a volume key hole 132, and the fourth frame 140 is disposed with a card slot hole 141.

The foregoing only describes preferable embodiments of the present invention, which shall by no means limit the patent scope of the present invention. All equivalent structural transformations made by using the content of specification and accompanying drawings of the present invention under the inventive concept of the present invention, or directly/indirectly applied in other related technical fields are included in the patent protection scope of the present invention.

What is claimed is:
1. A mobile phone middle plate having a sectional outer frame, comprising:
   an outer metal frame, a middle metal frame welded in the outer metal frame, and a first plastic member and a second plastic member which are disposed in the outer metal frame; wherein
   the outer metal frame is formed by splicing at least two metal section bars, the adjacent metal section bars have certain gaps so as to form an antenna separator; the gaps are welded together by concave connecting blocks, and the concave connecting blocks are welded on the inner side surface of the outer metal frame;
   the two sides of the middle metal frame are welded on the inner side surface of the outer metal frame;

the upper surface of the first plastic member is tightly attached to the inner side surface of the upper end of the outer metal frame, the upper surface of the first plastic member is disposed with first bulges matched with the gaps of the upper end of the outer metal frame respectively, the first bulges are clamped in the gaps on the upper end of the outer metal frame respectively, and the lower end of the first plastic member is clamped on the upper end of the middle metal frame; and the lower surface of the second plastic member is tightly attached to the inner side surface of the lower end of the outer metal frame, the lower surface of the second plastic member is disposed with second bulges matched with the gaps of the lower end of the outer metal frame respectively, the second bulges are clamped in the gaps on the lower end of the outer metal frame respectively, and the upper end of the second plastic member is clamped on the lower end of the middle metal frame.

2. The mobile phone middle plate having a sectional outer frame according to claim 1, wherein the lower end of the first plastic member is disposed with a plurality of trapezoid bulges, the upper end of the middle metal frame is disposed with grooves corresponding to the trapezoid bulges respectively, and during assembly, the trapezoid bulges are clamped in the grooves respectively.

3. The mobile phone middle plate having a sectional outer frame according to claim 1, wherein the first plastic member and the second plastic member are formed by intra-mold injection.

4. The mobile phone middle plate having a sectional outer frame according to claim 1, wherein the middle metal frame is formed by sheet metal working on stainless steel or a titanium alloy.

5. The mobile phone middle plate having a sectional outer frame according to claim 1, wherein the middle metal frame is formed by pressure casting an aluminum alloy.

6. The mobile phone middle plate having a sectional outer frame according to claim 1, wherein the outer side surfaces of the metal section bars are arcuate.

7. The mobile phone middle plate having a sectional outer frame according to claim 1, wherein the metal section bars are formed by bending 304 stainless steel or 316 stainless steel.

8. The mobile phone middle plate having a sectional outer frame according to claim 7, wherein the concave connecting blocks are made of stainless steel.

9. The mobile phone middle plate having a sectional outer frame according to claim 1, wherein the metal section bar is disposed with a key hole, a card slot hole or an earphone hole.

\* \* \* \* \*